B. A. SHAW.
AUTOMATIC FOWL SPRAY.
APPLICATION FILED SEPT. 12, 1919.
1,396,533.
Patented Nov. 8, 1921.
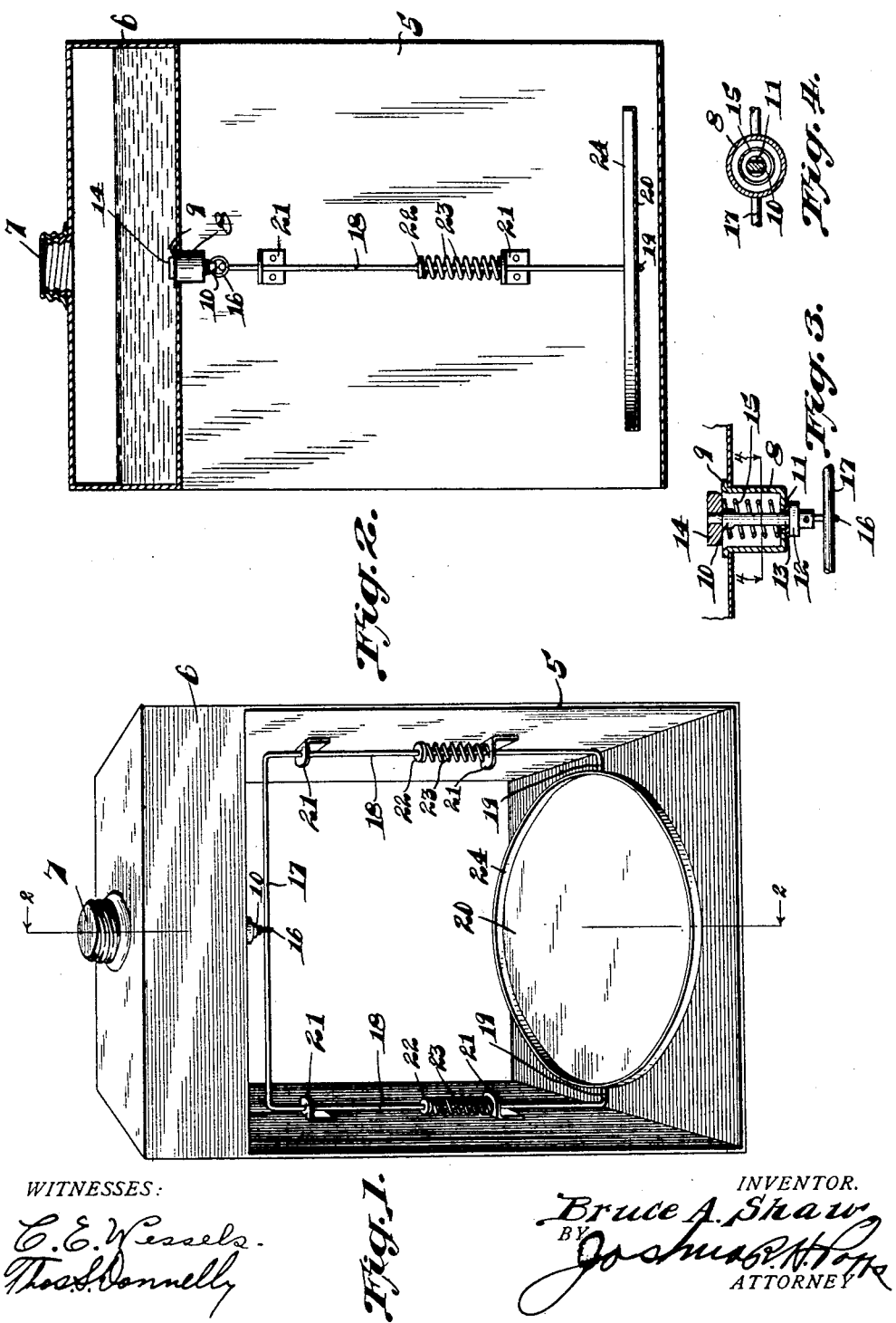

UNITED STATES PATENT OFFICE.

BRUCE A. SHAW, OF OAK PARK, ILLINOIS.

AUTOMATIC FOWL-SPRAY.

1,396,533.

Specification of Letters Patent.

Patented Nov. 8, 1921.

Application filed September 12, 1919. Serial No. 323,353.

*To all whom it may concern:*

Be it known that I, BRUCE A. SHAW, a citizen of the United States, and a resident of the city of Oak Park, county of Cook, and State of Illinois, have invented a certain new and useful Automatic Fowl-Spray, of which the following is a specification.

My invention relates to an automatic fowl spray, and has for its object the provision of a device of this class which is simple in structure, economic of manufacture and highly efficient in use.

Another object is the provision of a fowl spraying device which is adapted to automatically spray the fowl and provide a foot bath.

Other objects will appear hereinafter.

The invention consists in the combinations and arrangements of parts hereinafter described and claimed.

The invention will be best understood by reference to the accompanying drawings forming a part of this specification, and in which, Figure 1 is a perspective view of my invention.

Fig. 2 is a vertical sectional view taken on substantially line 2—2 of Fig. 1.

Fig. 3 is a central vertical section view of the valve used in my invention.

Fig. 4 is a transverse sectional view taken on substantially line 4—4 of Fig. 3.

The approved form of construction comprises a frame 5, mounted at the upper end of which is a tank 6. This tank 6 has the usual filling opening which is closed by a screw cap 7. Secured in an opening in the lower wall of the tank 6 is a cup-shaped valve 8. An annular flange 9 projects outwardly from the upper portion of the cup portion of the valve 8 and engages the upper surface of the lower wall of said tank. Connection between the wall of said tank and the flange 9 is made tight to prevent leakage, solder or other suitable means being used for this purpose. Mounted within the cup-shaped member 8 is a rod 10 which extends downwardly through the lower surface of said member 8, projecting through an opening 11 provided therein. Secured to the lower end of the rod 10 is a collar 12, positioned above which is a leather washer 13 which is adapted to engage the lower outer surface of the member 8 and securely and tightly close the opening 11. Secured to the upper end of the member 10 is a disk 14, which is adapted normally to project above the upper edge of the cup portion 8. The member 14 is so constructed as to fit snugly within the cup portion 8 when the rod 10 is moved downwardly relatively to the cup portion 8. Positioned intermediate the lower side of the cup member 8 and the disk 14 is a spiral spring 15 which is adapted to retain the member 14 in its normal position, that is, extending a little above the upper edge of the cup 8. As clearly seen in Fig. 3, the rod 10 has a portion of each side cut away, this cut-away portion terminating at its upper end slightly below the disk 14. In use, the liquid enters the cup portion 8 while the member 14 is at its normal position. Upon the downward movement of the rod 10, the member 14 enters the cup-shaped portion 8 and, because of its snug engagement with it, forces the liquid therein outwardly through the opening 11, the cut-away portion of the member 10 providing for the escape of the liquid on either side. As the member 14 moves downwardly into the cup-shaped portion 8, the entry of additional liquid into the cup 8 is prevented because of the snug engagement of the member 14 with the sides of the member 8, so that a certain predetermined amount of liquid is forced outwardly through the opening 11 upon each downward movement of the member 14. Upon release of the downwardly moving force from the member 10, the spiral spring restores the member 14 to its normal position, thereby bringing the member 13 into close engagement with the under surface of the member 8 and closing the orifice 11. Secured to the lower end of the member 10 is a ring 16 which is adapted to engage a horizontally extending rod 17. This horizontally extending rod 17 has at opposite ends downwardly extending portions 18. The lower ends of these downwardly extending portions 18 are turned inwardly to form engaging members 19 which are adapted to support a tray or pan 20. Secured to the walls of the frame 5 are guide members 21, through which the members 18 project. Securely fastened to the members 18 is a collar 22. Positioned between the collar 22 and the upper surface of one of the guide members 21 is a spiral spring 23. The construction is such that, upon downward movement of the pan 20, the members 18 are carried downward in opposition to the tension of the spring 23. Upon the release of the downwardly moving force from the pan 20, the spiral springs will again restore the pan to its former position relatively to the base of the frame 5. My device is intended to be used for spraying fowls. The device is set in front of the small door which leads into the hen house, or the like, so that the fowl, on making its exit from the house, is compelled to step upon the pan 20, thereby moving downwardly the member 17. This member 17 carries with it the member 10, and thereby forces the liquid which is contained in the cup 8, onto the back of the fowl. As the spiral spring 15 which is contained within the cup 8 is not of sufficient size to raise the pan and the rods 18, the additional spiral springs 23 are provided. An annular flange 24 extends upwardly from the pan 20. Before the fowls are allowed to pass over the pan 20, a portion of the louse killing fluid is placed upon the pan 24. This may be done by moving downwardly a few times the rods 18, thereby causing the louse killing fluid which is contained in the tank 6 to be conveyed to the pan 20. It thus is clear that the fowl, in passing over the pan, is given a foot bath of some louse killing fluid and at the same time is automatically sprayed from above with a louse killing fluid. It is designed to have the device so constructed that the back of the fowl, when the same stands upon the pan 20, is in close proximity to the valve which emits the spray. In this way, the force with which the liquid is ejected from the valve is utilized, and the louse killing fluid is directed into and under the feathers. It is also apparent that the fowl receives but a certain amount of the louse killing fluid, thereby eliminating the possibility of any evil consequences which might result from sprinkling the fowl with too great a quantity of the fluid. The utility of the foot bath is apparent, and it is also apparent that the louse killing fluid which does not adhere to the fowl will drop to the pan 20, and in this way the initial amount of fluid in the pan will be approximately constant, as the amount clinging to the feet will be replenished by the fluid dripping from the body of the fowl. Of course, a louse killing powder may be used as well as a liquid.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. A device of the class described comprising, a tank; a valve mounted on said tank; a depending supporting member connected with said valve, adapted, upon downward movement, to open said valve and emit a certain amount of fluid from said tank; and a pan mounted on said supporting member, substantially as described.

2. A device of the class described comprising, a tank; a valve mounted on said tank for emitting, when actuated, a certain amount of louse killing preparation from said tank; and means of applying a louse killing preparation to the feet of a fowl upon passing under said tank; and operative connections whereby said means actuates said valve substantially as described.

3. A device of the class described comprising a tank supported in elevated position with a passageway thereunder; a valve communicating with said tank for controlling the escape of the contents therefrom; a cross bar connected with said valve adapted by a downward movement to open said valve; downwardly extending bars carried by said cross bar; a pan carried by said downwardly extending bars; and springs operatively connected with said pan at opposite sides thereof for yieldingly supporting said pan, substantially as described.

In testimony whereof I have signed my name to this specification in the presence of two subscribing witnesses.

BRUCE A. SHAW.

Witnesses:
JOSHUA R. H. POTTS,
LAURA J. ERICKSON.